United States Patent [19]

Urata et al.

[11] 4,260,120
[45] Apr. 7, 1981

[54] TAPE DRIVING APPARATUS

[75] Inventors: Yoshihito Urata, Katano; Toshiharu Sasaki, Kawanishi, both of Japan

[73] Assignee: Matsushita Electric Industrial Co., Ltd., Osaka, Japan

[21] Appl. No.: 58,812

[22] Filed: Jul. 17, 1979

[30] Foreign Application Priority Data

Jul. 20, 1978 [JP] Japan .................................. 53-89054

[51] Int. Cl.³ .......................... G03B 1/04; G11B 15/32
[52] U.S. Cl. .................................................. 242/201
[58] Field of Search .............................. 242/200-204; 360/73, 74, 96

[56] References Cited

U.S. PATENT DOCUMENTS 3,554,465   9/1969   Marukawa ........................... 242/201
3,610,553  10/1971   Matsuyama ......................... 242/201

FOREIGN PATENT DOCUMENTS 2502266  7/1976  Fed. Rep. of Germany ........... 242/201

Primary Examiner—Leonard D. Christian
Attorney, Agent, or Firm—Wenderoth, Lind & Ponack

[57] ABSTRACT

A tape driving apparatus has an intermediate wheel non-coaxial with a pair of reel hubs and a capstan, and plural idle gears for selectively transmitting the rotating motion to said reel hubs, which are mounted to turn around the intermediate wheel, and a control member for controlling the movement of the idle gears in the required direction. Thereby, the reel hubs are driven and controlled to rotate fast or slow corresponding to the relative movement of the intermediate wheel and the plural idle gears, independently of the rotating motion of the fly-wheel.

6 Claims, 5 Drawing Figures

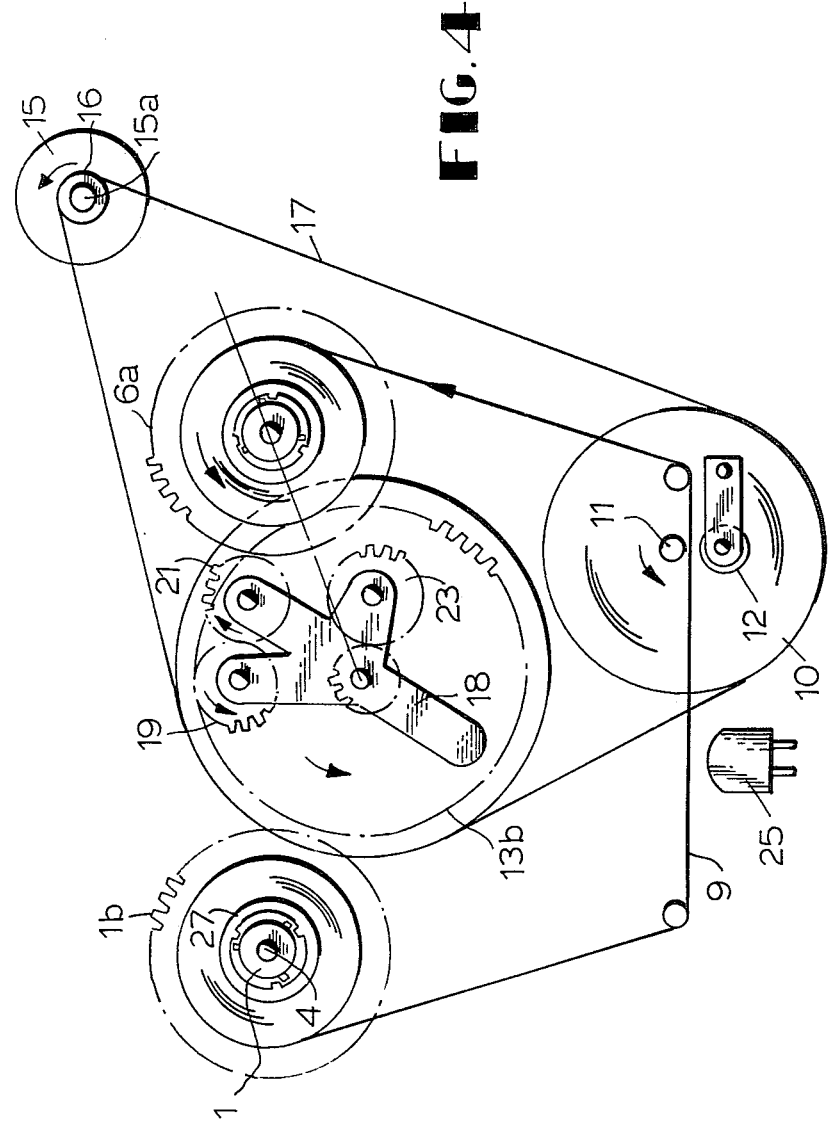

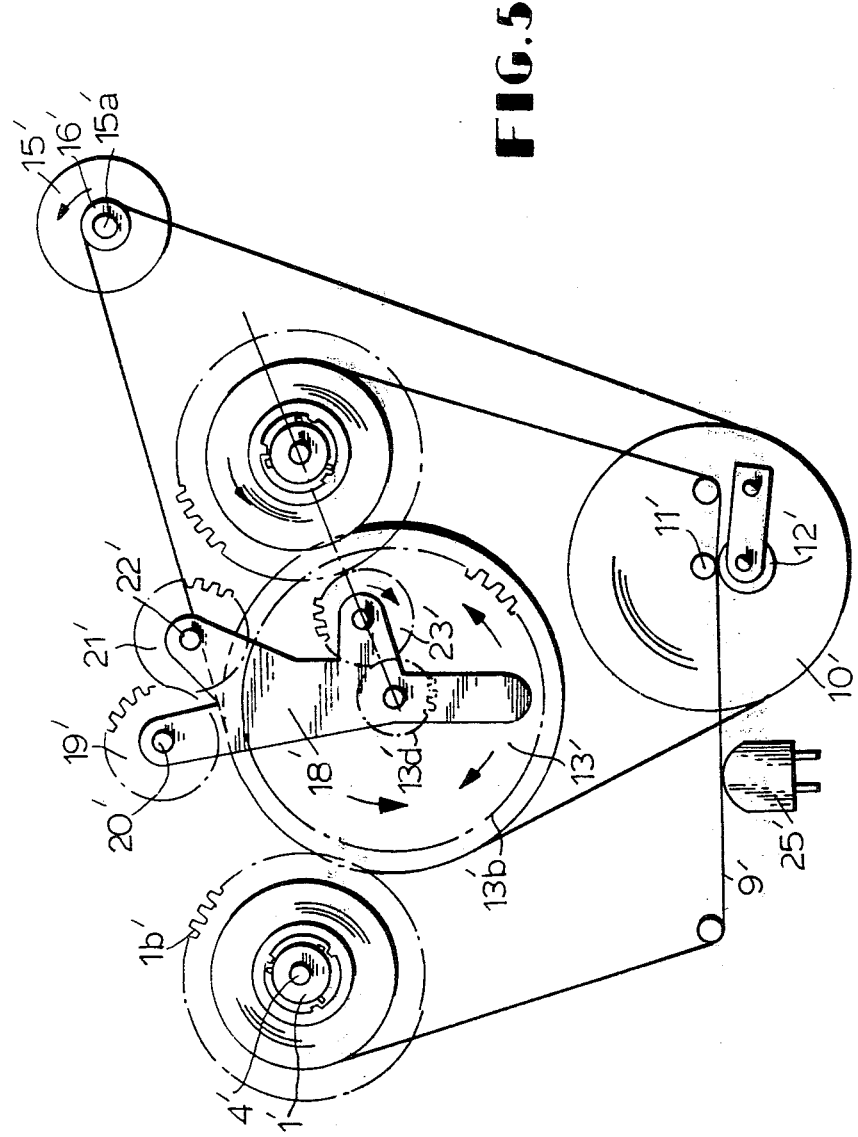

TAPE DRIVING APPARATUS

This invention relates to a tape driving apparatus for a tape and more particularly for a magnetic tape recording and/or reproducing apparatus.

It is well known that a magnetic tape recording and/or reproducing apparatus is operated slowly to wind a tape on a take-up reel from a supply reel when the apparatus is in recording and/or reproducing state, or fast when a tape is wound fast, or to rewind a tape on a supply reel from a take-up reel rapidly. Therefore, in view of the size, quality, reliability and cost of such apparatus, it is very important to design such tape reeling means well.

For example, in a conventional apparatus of this kind, one or plural motors are controlled for driving reels. In this case, it is necessary to control well and rapidly change the revolution or direction of such motors depending on the required movement of the tape. So, in such prior art apparatus, well designed but complex and expensive electric circuits are needed for controlling such motors.

Another conventional apparatus employs only one motor which is rotated at a substantially constant speed. In this case, it is necessary to operate many idle means such as idlers, gear wheels, a pinion and a belt so as to couple a take-up reel or supply reel to the motor selectively depending on the required movement of the tape. In this case, the electric circuit for the motor can be comparatively simple, but the mechanism for reeling and controlling the tape becomes complex. So, in such prior art apparatus, the apparatus sometimes becomes large or complex.

In a further conventional apparatus, such tape reels are driven by the rotational motion of a capstan fly-wheel. In this case, the rotation of the capstan is sometimes effected by the ripple of the rotation of the tape reels, so what wow and flutter sometimes occur.

It is therefore an object of the invention to provide a simple and improved tape driving apparatus.

Another object of the invention is to provide a compact and easily operable tape driving apparatus, more particularly one suitable for an apparatus employing only one motor.

Another object of the invention is to provide an improved apparatus having a higher quality of recording and reproducing than prior art apparatus.

A further object of this invention is to provide an improved apparatus suitable for a hand type tape recorder.

These objects are achieved according to this invention by providing a tape driving apparatus which comprises:

a tape drive capstan fixed on a fly-wheel; a pinch-roller; a pair of reel hubs for supplying and taking up the tape; an intermediate wheel for driving said reel hubs, which wheel has a rotational axis disposed non-coaxially with the rotational axes of said reel hubs and said capstan; plural idle wheels for selectively transmitting the rotating motion of said intermediate wheel to either one of said reel hubs, said idle wheels being mounted to turn around said rotational axis of said intermediate wheel; control means for controlling the movement of said idle wheels in a required direction; and driving means for driving said fly-wheel and said intermediate wheel, whereby said reel hubs are driven and controlled so as to run fast or slow corresponding to the relative movement of said intermediate wheel and said plural idle wheels, independently of the rotating motion of said fly-wheel.

Preferably in this apparatus, said intermediate wheel is disposed between said rotational axes of the reel hubs and substantially at the same level and alongside said fly-wheel.

Advantageously a closed belt is stretched around said intermediate wheel, said capstan fly-wheel and an electric motor, whereby the apparatus is driven by said electric motor.

Further advantageously, said intermediate wheel has coaxially integral plural drive wheels having diameters different from each other and respectively coupled with said idle wheels so as to drive said reel hubs fast or slowly. More specifically, said plural drive wheels preferably comprise an external wheel with a small diameter for driving said reel hubs slowly, and an internal wheel with a larger diameter for driving said reel hubs fast, and which is arranged to face to said external wheel at the same level, whereby said idle wheels are coupled respectively to either one of said drive wheels in the space between said external wheel and said internal wheel. Thereby, the apparatus can be made very compact and small.

More advantageously, at least one of said idle wheels is coupled with said intermediate wheels and said reel hubs on a line drawn from the rotational axis of said intermediate wheel through the axis of said reel hubs, whereby the apparatus can be easily changed to one of many reel drive modes by operating said control means alone.

These objects and features of this invention will become apparent from the following detailed description taken in conjunction with the accompanying drawings, in which:

FIG. 4 is a schematic plan view which shows the positions of the parts of the apparatus during fast winding; and FIG. 5 is a schematic plan view which shows another example of the apparatus of this invention.

Figure 1:
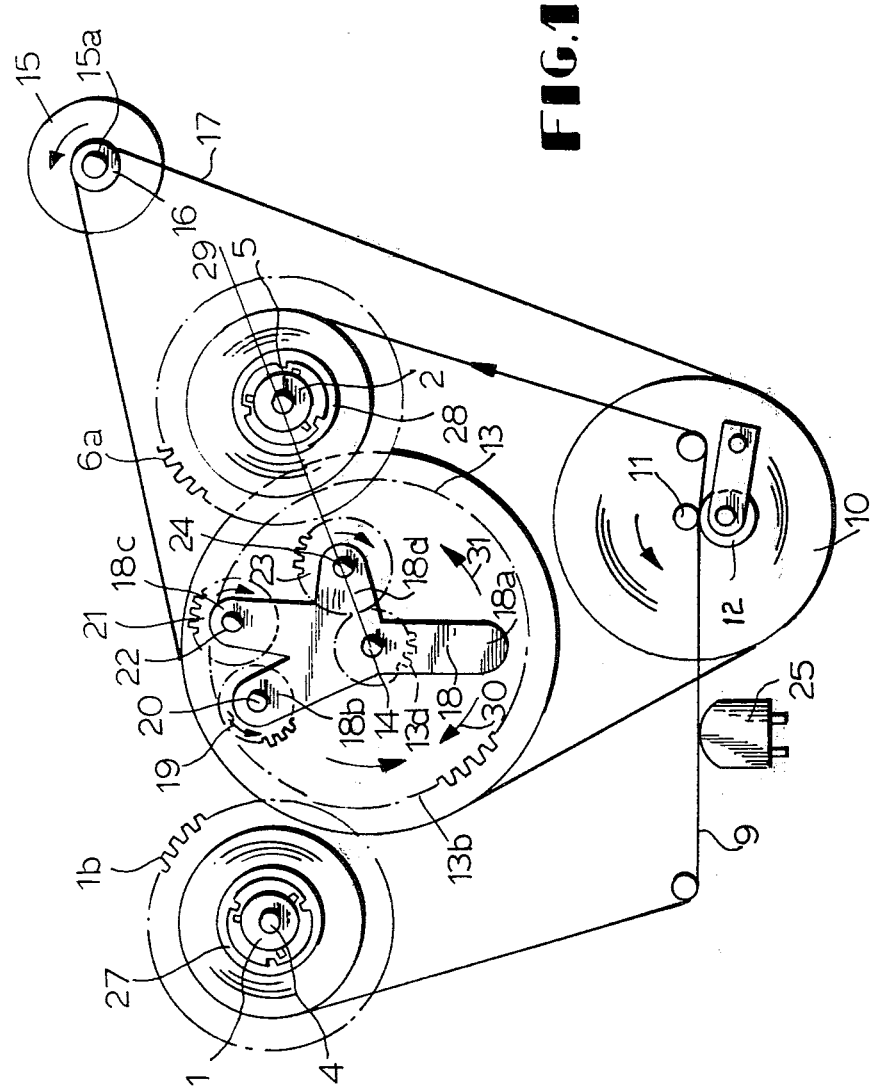
FIG. 1 is a schematic plan view of a tape driving apparatus in a magnetic tape recording and/or reproducing apparatus.
Figure 2:
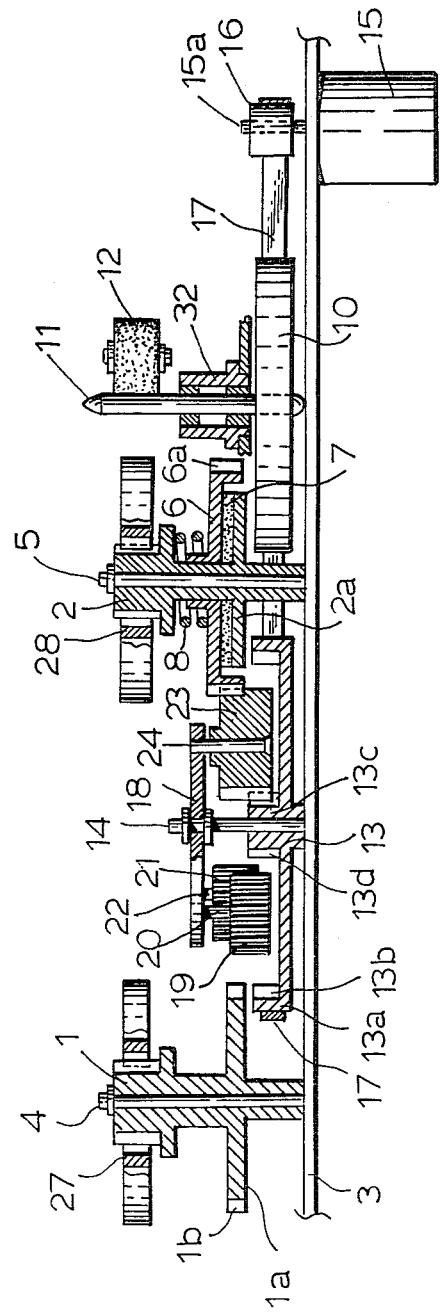
FIG. 2 is a cross-sectional view of the apparatus of FIG. 1.

Referring now to FIGS. 1 and 2, a pair of reel hubs 1 and 2 are mounted so as to rotate about the shafts 4 and 5 fixed on a base plate 3. Supply reel hub 1 has a gear wheel 1a with teeth 1b. Take-up reel hub 2 comprises a friction wheel 2a, a friction member 7, a gear wheel 6 with gear teeth 6a and a pressure spring 8. They are pressed together coaxially under the pressure of the spring 8.

An intermediate wheel 13 is rotatably mounted on a about shaft 14 fixed on the base plate 3. This intermediate wheel 13 has two drive gears. One is an internal gear 13a with a large diameter, and the other one is an external gear 13c with a small diameter. These respectively have teeth 13b and 13d thereon. A capstan 11 is rotatably mounted in a bearing 32 and fixed on a fly-wheel 10.

An electric motor 15 is fixed on the base plate 3, and has a drive shaft 15a on which is mounted a drive wheel 16. An endless belt 17 extends around the intermediate wheel 13 and the fly-wheel 10 and over said drive wheel 16 driven by the electric motor 15. A control member 18 is mounted pivotally on the shaft 14, and has arms 18a, 18b, 18c and 18d. On the arm 18b, and idle gear 19 is rotatably mounted on a shaft 20. On the arm 18c, an idle gear 21 is rotatably mounted on a shaft 22. On the arm 18d, an idle gear 23 is rotatably mounted on a shaft 24. These idle gears 19, 21, 23 are similarly toothed. The idle gear 19 is meshed with the internal gear 13a of the intermediate wheel 13, and the idle gear 21 is meshed with the idle gear 19, and the idle gear 23 is meshed with the external gear 13c.

Also, it will be seen in FIG. 1 that the idle gear 23 is disposed on a line 29 drawn from the axis of the intermediate wheel 13 through the axis of take-up hub 2 so as to be coupled to the gear 6 of the take-up reel hub 2.

The idle gears 19, 21 and 23 mounted on the control member 18 can be rotated around the shaft 14 coaxially with the rotational axis of the intermediate wheel 13, keeping while remaining meshed with the intermediate wheel 13 by moving the arc 19a. The control member 18 can thus control the gears to rotate them clockwise or counterclockwise around the axis of shaft 14.

The position of the control member 18 as shown in FIG. 1 is called "a first position". Upon rotation of the motor counterclockwise in FIG. 1, the capstan 10 and intermediate wheel 13 are rotated counterclockwise together and the take-up reel hub 2 is rotated counterclockwise. As a result, the tape 9 is drawn off the supply reel 27 by the capstan 11 and the pinch roller 12 urged toward the capstan, and then wound upon a take-up reel 28. At this time, the apparatus is recording on or reproducing from the tape through the magnetic head 25.

When the control member 18 is moved in the counterclockwise direction as indicated by the arrow 31 in FIG. 1, it is moved to the second position shown in FIG. 1, and then the idle gears 19, 21 and 23 are rotated together around the shaft 14 coaxially with the intermediate wheel 13. As a result, the parts of the apparatus are changed to the positions as shown in FIG. 3.

Figure 3:
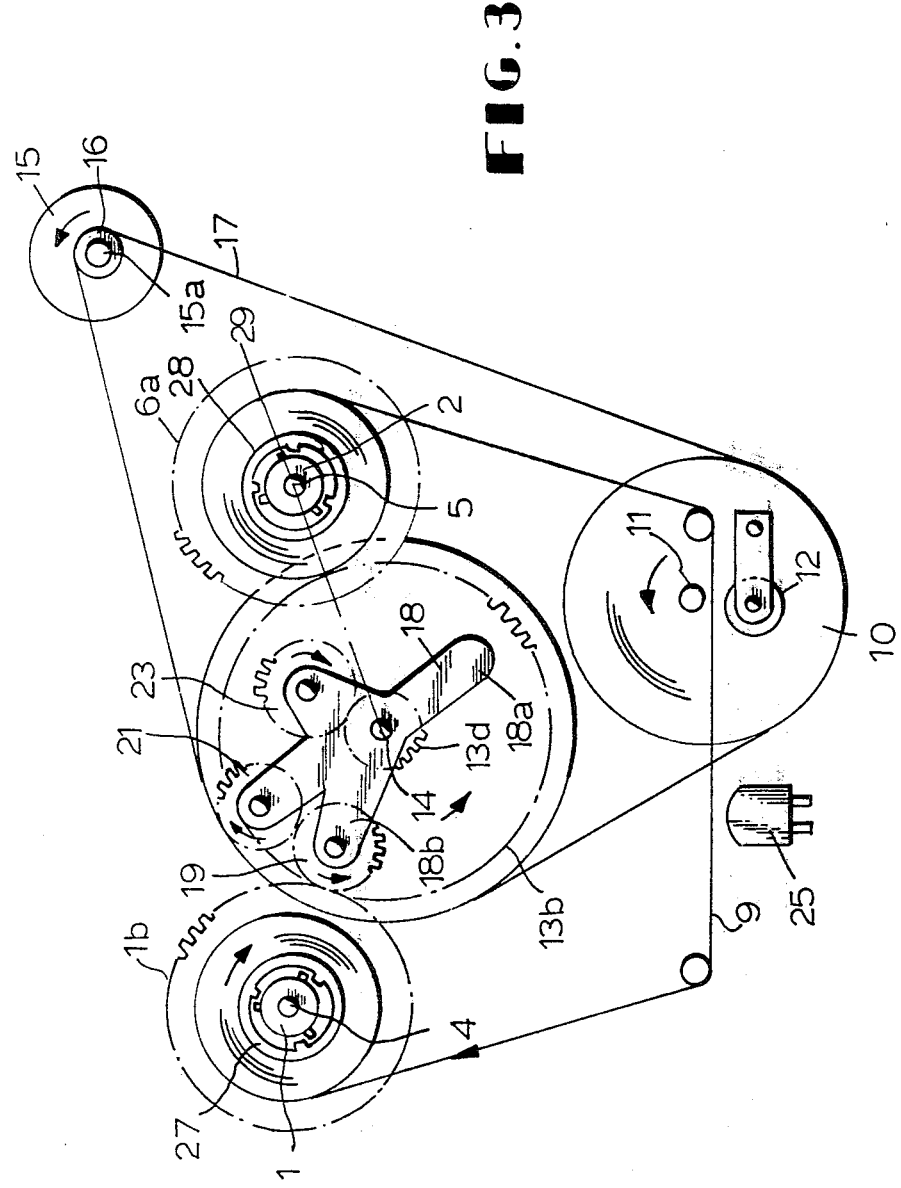
FIG. 3 is a schematic plan view which shows the positions of the parts of the apparatus during rewinding.

In FIG. 3, the idle gear 23 is disengaged from the take-up reel hub 2, and the idle 19 is meshed with the supply reel hub 1. In this case, when the motor 15 is driven in the same direction as that described above, the supply reel hub 1 is rotated in the clockwise direction at a higher speed than the speed in the above described state. This is because the idle gear 19 is meshed with the teeth 13b of the intermediate wheel 13 which has a larger diameter than that of the external gear 13c. Thus, the tape 9 is rapidly rewound from the take-up reel 28 onto the supply reel 27. Of course, in this case in FIG. 3, the magnetic head 25 and the pinch-roller 12 are extracted, i.e. they are moved out of engagement with the tape 9.

When the control member 18 is moved in the clockwise direction as indicated by the arrow 31 in FIG. 1, and then disposed in the third position as shown in FIG. 4, it will be seen that the idle gears 19 and 23 are disengaged from the reel hubs 1 and 2, and the idle gear 21 is meshed with the take-up reel hub 2. The idle gear 21 is also meshed with the idle gear 19, and further the idle gear 19 is meshed with the internal gear 13a of the intermediate wheel 13.

When the electric motor 15 is driven in the same manner as described above, the take-up reel hub 2 is rotated counterclockwise at a high speed. Thereby, the tape 9 is wound rapidly from the supply reel 27 onto the take-up reel 28. Of course, in this case, the magnetic head 25 and the pinch-roller 12 are retracted.

The stop mode of apparatus can be obtained by locating the control member 18 at a neutral position where no idle gears are meshed with the reel hubs, or by stopping the electric motor. And further the control member 18 can move freely to any position such as the first, second and third position while the electric motor is rotating.

If more idle wheels than those used above are employed, it is possible to obtain more reel driving modes than those obtained above.

It is also possible to employ frictional coupling means such as a frictional roller in place of the coupling means such as idle gears 19, 21 and 23.

Also, in another modification of this invention, it is possible to couple the idle gears to an external 13'b instead of to an internal gear 13a, as shown in FIG. 5, wherein similar members are illustrated with corresponding primed numbers. But in the embodiment of FIG. 5, the apparatus will be larger than that of FIG. 1.

From the foregoing description and the drawings, it will be obvious that, by moving only the control member 18, the reel drive mode can be freely and sequentially changed to the desired mode such as the recording and/or reproducing, fast winding and fast rewinding modes, independently of the rotating movement of the capstan, while the electric motor is being driven at a constant speed and in the same direction.

As apparent from the foregoing, this invention makes possible a tape driving apparatus which is compact and easy to operate. This particular apparatus can of course be used also with advantage in apparatus other than tape recorders.

Many possible modifications will become apparent from the spirit of the invention. However, the foregoing disclosure is presented in an illustrative sense rather than a limited sense and the appended claims are relied upon to define the scope of this invention.

What is claimed is:

1. A tape driving apparatus for driving a magnetic tape, comprising:

a pair of reel hubs for carrying reels for supplying and taking up the tape;

an intermediate wheel having a rotational axis disposed non-coaxially relative to the rotational axes of said reel hubs;

driving means connected to said intermediate wheel for driving said intermediate wheel;

control means for controlling the connection of said intermediate wheel to said reel hubs for respectively driving said hubs in the desired direction and at the desired speed, said control means being pivotally mounted for movement around an axis coaxial with the rotational axis of said intermediate wheel between first, second and third positions; and a plurality of idle wheels mounted on said control means and connected to said intermediate wheel for being driven by said intermediate wheel, and being constituted by a first idle wheel which is driven by said intermediate wheel at a low speed and is connected to one of said reel hubs only when said control means is in said first position, a second idle wheel which is driven by said intermediate wheel at a high speed and is connected to the other of said reel hubs only when said control means is in said second position, and a third idle wheel which is driven by said intermediate wheel at a high speed and is connected to said one of said reel hubs only when said control means is in said third position, whereby said reel hubs are driven and controlled for slow winding, fast winding and fast rewinding.

2. A tape driving apparatus as claimed in claim 1 in which said first position is between said second and third positions, and said first idle wheel lies on a line between the rotational axis of said one reel hub and said intermediate wheel when said control means is in said first position.

3. A tape driving apparatus as claimed in claim 1 in which said intermediate wheel is a gear wheel having a low speed gear and a high speed gear thereon and said idle wheels are idle gears respectively meshed with said low speed gear and said high speed gear.

4. A tape driving apparatus as claimed in claim 3 in which said low speed gear is an external gear having a small diameter with which said first idle gear is meshed, and said high speed gear is a large diameter gear coaxial with and integral with said low speed gear with which one of said second and third idle gears is meshed with the other of the second and third idle gears being meshed with said one of the second and third idle gears.

5. A tape driving apparatus as claimed in claim 4 in which said high speed gear is an internal gear, and said low speed gear and said high speed gear are on the same level and said idle gears are between said low speed gear and said high speed gear for being meshed with said low speed gear and said high speed gear in the space therebetween.

6. A tape driving apparatus as claimed in claim 1, further comprising: a tape drive capstan; a fly wheel on which said capstan is coaxially mounted for being driven by the fly wheel; a pinch roller movable toward and away from said capstan, said intermediate wheel being positioned between the rotational axes of said hubs and at substantially the same level and beside said fly wheel; and said driving means comprises an electric motor having a constant speed drive shaft and an endless belt extending around said drive shaft, said intermediate wheel and said fly wheel.

* * * * *